Patented July 17, 1928.

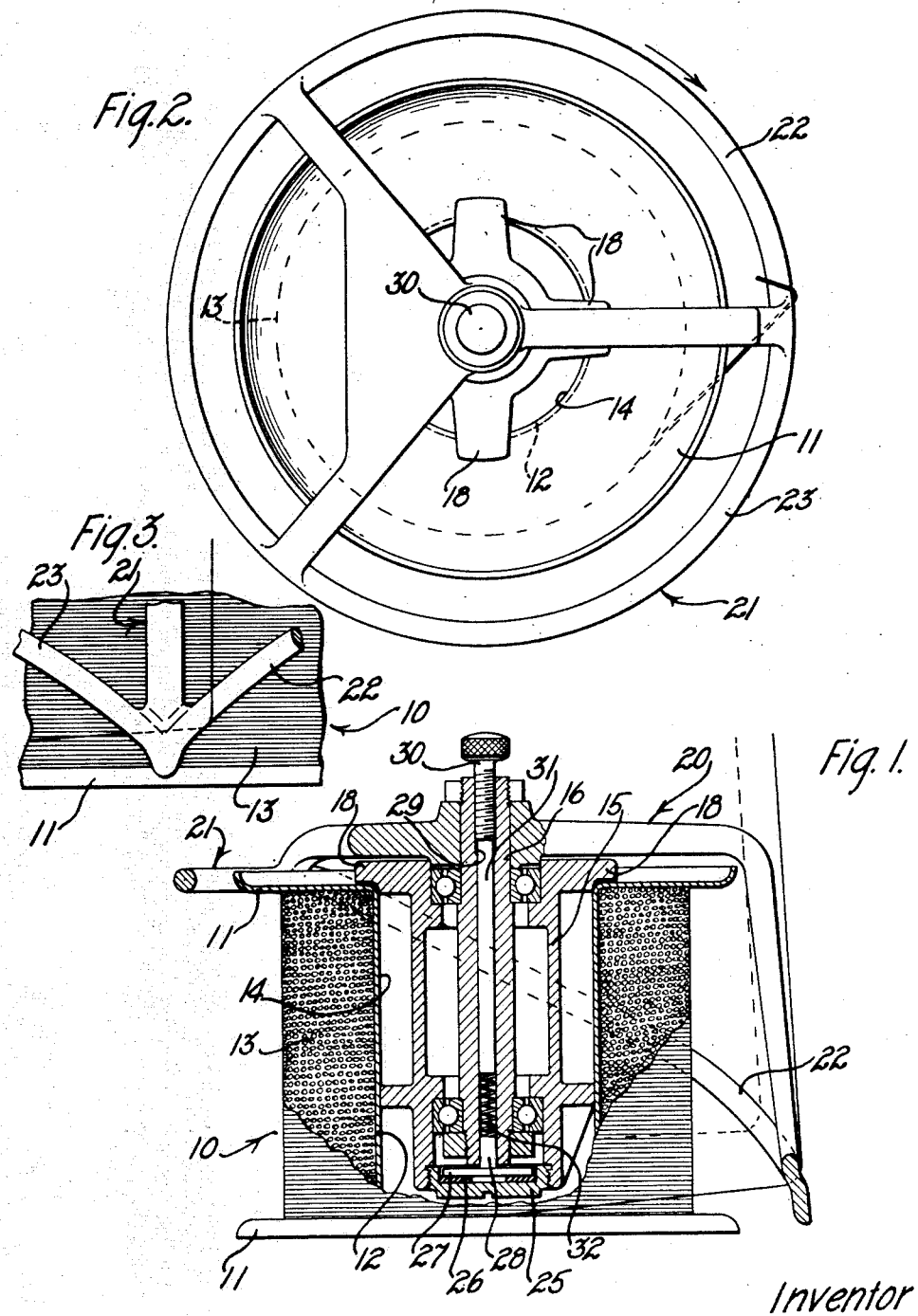

1,677,217

UNITED STATES PATENT OFFICE.

JOHN NILSEN SELVIG, OF CHICAGO, ILLINOIS, ASSIGNOR TO WESTERN ELECTRIC COMPANY INCORPORATED, OF NEW YORK, N. Y., A CORPORATION OF NEW YORK.

MATERIAL-UNWINDING DEVICE.

Application filed September 21, 1926. Serial No. 136,754.

This invention relates to material unwinding devices, and more particularly to a strand unwinding attachment for supply spools.

The principal object of the invention is the provision of a simple and inexpensive unwinding device for supplies of material wherein the tension upon the material is reduced to a minimum and maintained uniform under varying conditions.

In accordance with the invention there is provided in one embodiment thereof an annular member which is rotatably carried by a plug adapted to be inserted in the bore of a supply spool. The annular member is preferably of larger diameter than the spool head and is provided with a cam portion which is constantly engaged by the moving strand as it leaves the supply spool causing the member to be rotated in the direction in which the strand is withdrawn from the spool. The cam portion is of such a design that the strand is drawn substantially at right angles to the axis of the spool at all times throughout the length of the spool whereby the tension upon the strand is reduced to a minimum and maintained substantially uniform.

Other features and advantages of the invention will become apparent in the following detailed description, reference being had to the accompanying drawing, wherein:

Fig. 1 is a vertical section of a strand unwinding device embodying the features of the present invention;

Fig. 2 is a top plan view thereof, and

Fig. 3 is a fragmentary detail view of a portion of the unwinding device.

Referring to the drawing in detail, the numeral 10 indicates, generally, a stationary vertically positioned supply spool of any suitable type having the usual upper and lower heads 11—11 and a hollow core or drum 12 upon which is carried a supply of wire 13. Removably inserted within the central bore 14 of the drum 12 is a hollow plug 15 within which is rotatably journaled a hollow spindle 16 disposed in axial alignment with the bore 14. The plug 15 is provided at one end with a plurality of flanges 18 which engage the top surface of the upper spool head 11 when the plug is inserted in place as shown in Fig. 1.

Secured to the spindle 16 so as to be rotatable therewith is a flier or unwinding device 20 comprising an annular member 21 which is preferably of larger diameter than the spool heads 11—11. The member 21 is provided with cam portions 22 and 23 which are disposed at an angle with respect to the spool heads and extend substantially across the whole length of the core of the spool. The wire is withdrawn from the stationary supply spool by any suitable means (not shown) and passes upwardly as shown in Fig. 1. The moving wire engages either the cam portion 22 or the cam portion 23 of the flier according to whether the spool winding is left hand or right hand. In the drawing, a spool having a left hand winding is illustrated and the wire is therefore shown engaging the cam portion 22. As the wire is withdrawn from the spool it moves back and forth along the cam portion 22 which is so designed that the wire is withdrawn from the spool substantially at right angles to the axis thereof at all times.

In practice, beneficial results have been obtained when the cam portions 22 and 23 of the flier are designed so as to form an angle of approximately 45° with the heads of the supply spool. This angle, however, varies in accordance with the direction in which the wire travels after it leaves the flier.

Threaded upon the lower end of the plug 15 is a cap 25 which supports an annular friction pad 26. A circular disk 27 engaging the friction pad 26 is provided with a central stud 28 projecting upwardly into the lower end of a central bore 29 of the spindle. The construction is such that the stud 28 is constrained to rotate with the spindle 16 and is free to move vertically within the bore 29 thereof. Threaded in the opposite end of the bore 29 is an adjusting screw 30, and slidably mounted between the adjusting screw 30 and the stud 28 is a rod 31. A spiral compression spring 32 interposed between the stud 28 and the lower end of the rod 31 serves to normally urge the disk 27 downwardly in contact with the friction pad 26, whereby a braking action is provided which tends to retard the free rotation of the flier. It is apparent that by turning the adjusting screw 30 the tension of the spring 32 may be varied and thus the pressure between the disk 27 and the friction pad 26 may be changed so as to increase or decrease the retarding effect or drag on the flier.

Although the above specification and the accompanying drawing disclose only one specific embodiment of the invention, it should be understood that the invention is capable of other applications within the scope of the appended claims.

What is claimed is:

1. A strand unwinding device comprising a member rotatably carried by a supply spool and rotated by the strand being withdrawn therefrom, said member having strand engaging cam portions extending diagonally across the core of the spool and designed so that the strand is withdrawn from the spool substantially at right angles to the axis thereof at all times.

2. A material unwinding device comprising a rotatable member having a material engaging portion designed so that the material is withdrawn from a supply substantially at right angles to the axis thereof at all times, a frictional plate member for retarding the free rotation of said rotatable member, and means for varying the retarding effect of said frictional plate member.

3. A strand unwinding device comprising a member adapted to be inserted in the bore of a supply spool, a flier rotatably carried by said member and rotated by a strand being withdrawn from the spool, said flier having strand engaging portions designed so that the strand is withdrawn from the spool substantially at right angles to the axis thereof at all times, and means for retarding the rotation of the flier.

4. In a device for unwinding material from a stationary supply thereof, a member encircling the supply and adapted to be rotated around the supply by the material as it is withdrawn therefrom, said member having a continuous material engaging cam portion designed so that the material is withdrawn from the supply substantially at right angles to the axis thereof at all times.

5. In a device for unwinding strand material from a stationary supply spool, a member adapted to be inserted in the bore of the spool, a flier rotatably carried by said member, said flier having oppositely disposed semi-circular strand engaging portions extending diagonally across the core of the spool and terminating in portions disposed opposite the heads of the spool.

In witness whereof, I hereunto subscribe my name this 7th day of September A. D., 1926.

JOHN NILSEN SELVIG.